US012099945B2

(12) United States Patent
Kakemura (10) Patent No.: US 12,099,945 B2
(45) Date of Patent: Sep. 24, 2024

(54) COMMUNICATION MANAGEMENT APPARATUS

(71) Applicants:KABUSHIKI KAISHA TOSHIBA, Minato-ku (JP); TOSHIBA DIGITAL SOLUTIONS CORPORATION, Kawasaki (JP)

(72) Inventor: Atsushi Kakemura, Kokubunji (JP)

(73) Assignees: KABUSHIKI KAISHA TOSHIBA, Minatu-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 372 days.

(21) Appl. No.: 17/437,674

(22) PCT Filed: May 27, 2020

(86) PCT No.: PCT/JP2020/020953
§ 371 (c)(1),
(2) Date: Sep. 9, 2021

(87) PCT Pub. No.: WO2020/241701
PCT Pub. Date: Dec. 3, 2020

(65) Prior Publication Data
US 2022/0164758 A1 May 26, 2022

(30) Foreign Application Priority Data
May 31, 2019 (JP) ................................ 2019-102543

(51) Int. Cl.
*G06Q 10/0631* (2023.01)
*G10L 13/08* (2013.01)
(Continued)

(52) U.S. Cl.
CPC ...... *G06Q 10/063118* (2013.01); *G10L 13/08* (2013.01); *G10L 15/22* (2013.01); *G06F 3/0484* (2013.01)

(58) Field of Classification Search
None
See application file for complete search history.

(56) References Cited

U.S. PATENT DOCUMENTS

2004/0162724 A1* 8/2004 Hill .................... G10L 15/22
704/231
2008/0130690 A1* 6/2008 Hann .................. H04J 3/0664
375/357
(Continued)

FOREIGN PATENT DOCUMENTS

JP     2004-15710 A    1/2004
JP     2015-27369 A    2/2015
(Continued)

OTHER PUBLICATIONS

Gilbert "Synchronization of Binary Messages", Dec. 1959, IRE Transactions on Information Theory, pp. 470-477 (Year: 1959).*
(Continued)

*Primary Examiner* — Romain Jeanty
(74) *Attorney, Agent, or Firm* — Maier & Maier, PLLC (57) ABSTRACT

A communication management apparatus creates pieces of character string button information for incorporating part or all of a message content in text format into a character string constituting message information. The communication management apparatus: transmits the pieces of character string button information to a second terminal that is input the message information directed to users at message destinations, and receives the message information in text format created in response to selection of at least one of the pieces of character string button information on the second terminal; creates synthesized voice data representing the message (Continued)

information and broadcasts the synthesized voice data to plural third terminals of the users; and accumulates the message content, the message information, and the result of voice recognition received from the third terminal in chronological order as a communication history and controls transmission to display the communication history on the terminals in synchronization.

11 Claims, 6 Drawing Sheets

(51) Int. Cl.
*G10L 15/22* (2006.01)
*G06F 3/0484* (2022.01)

(56) References Cited

U.S. PATENT DOCUMENTS

| | | | |
|---|---|---|---|
| 2010/0192064 A1* | 7/2010 | Beppu | G06Q 30/02 715/710 |
| 2015/0038235 A1 | 2/2015 | Kamekawa | |
| 2019/0329131 A1 | 10/2019 | Kamekawa | |
| 2019/0329132 A1 | 10/2019 | Kamekawa | |
| 2020/0188785 A1 | 6/2020 | Kamekawa | |
| 2021/0077902 A1 | 3/2021 | Kamekawa | |

FOREIGN PATENT DOCUMENTS

| | | | | |
|---|---|---|---|---|
| JP | 2018-7005 A | | 1/2018 | |
| JP | 201877877 A | | 5/2018 | |
| WO | WO-2004003577 A1 | * | 1/2004 | ........... G01R 31/023 |
| WO | WO-2006031609 A2 | * | 3/2006 | ......... G06F 16/3344 |
| WO | WO-2018043137 A1 | * | 3/2018 | ......... G06F 17/2775 |

OTHER PUBLICATIONS

Peggy "Communication Management", Dec. 2014, The International Encyclopedia of Communication, pp. 1-9 (Year: 2014).*
International Search Report issued Sep. 1, 2020 in PCT/JP2020/020953 filed May 27, 2020, 2 pages.

* cited by examiner

(USER INFORMATION 121)

| USER ID | USER NAME | ATTRIBUTE | GROUP |
|---|---|---|---|
| U0001 | ×××× | GROUP USER (GU) | G0001 |
| U0002 | ××××× | GROUP USER (GU) | G0001 |
| U0003 | ××××× | GROUP USER (GU) | G0001 |
| ××× | ××××× | ××××× | G0001 |
| R0001 | ××××× | GROUP LEADER (GR) | G0001 |
| I0001 | ××××× | INSTRUCTION SENDER (Instruction Sender) | G0001 |

(GROUP INFORMATION 122)

| COMMUNICATION GROUP ID | COMMUNICATION GROUP NAME |
|---|---|
| G0001 | ××××× |
| ××××× | ××××× |

(PRESET INFORMATION 123)

| PRESET ID | ATTRIBUTE | CONTENTS |
|---|---|---|
| P001 | USER NAME | MR. TANAKA |
| P002 | ××××× | MR. SATO |
| P003 | ××××× | MR. SUZUKI |
| P004 | ××××× | ××××× |
| P005 | FIXED PHRASE | PLEASE RETURN MESSAGE LATER. |
| ××××× | ××××× | ××××× |

FIG.5

(COMMUNICATION HISTORY INFORMATION 124)

| TIME INFORMATION | WORK REQUESTER (TEXT INPUT) | WORK MANAGER | | | WORKER A | | WORKER B | | WORKER C | |
|---|---|---|---|---|---|---|---|---|---|---|
| | | INPUT TEXT | SYNTHESIZED VOICE | RESULT OF CHARACTER RECOGNITION | VOICE OF WORKER A | RESULT OF CHARACTER RECOGNITION | VOICE OF WORKER B | RESULT OF CHARACTER RECOGNITION | VOICE OF WORKER C | |
| 11:20:00 | PLEASE CLEAN ROOM 101. PLEASE CHECK ROOM 203. PLEASE LOCK ROOM 402. | | | | | | | | | ..... |
| 11:20:30 | | THIS IS ○○. I UNDERSTAND. | | | | | | | | ..... |
| 11:21:00 | | MR. TANAKA, PLEASE CLEAN ROOM 101. | ○ | OK. | ○ | | | | | ..... |
| 11:22:00 | | MR. SATO, PLEASE CLEAN ROOM 203. | ○ | | | I SEE. | ○ | | | ..... |
| 11:21:20 | | MR. TANAKA, PLEASE CLEAN ROOM 101. | ○ | | | | | I UNDERSTAND. | ○ | ..... |
| ..... | ..... | ..... | ..... | ..... | ..... | ..... | ..... | ..... | ..... | ..... |
| 13:05:20 | PLEASE CLEAN ROOM 111. | THIS IS ○○. I UNDERSTAND. | | | | | | | | ..... |
| 13:06:05 | | MR. TANAKA, PLEASE CLEAN ROOM 101. PLEASE RETURN MESSAGE LATER. | ○ | OK. I'LL RETURN MESSAGE AFTER CLEANING. | ○ | | | | | ..... |
| ..... | ..... | ..... | ..... | ..... | ..... | ..... | ..... | ..... | ..... | ..... |

(TIME-SERIES TRANSITION OF INSTRUCTIONS)

COMMUNICATION MANAGEMENT APPARATUS

TECHNICAL FIELD

Embodiments of the present invention relate to a technique for assisting in communication using voice and text (for sharing of recognition, conveyance of intention and the like).

BACKGROUND ART

Communication by voice is performed, for example, with transceivers. A transceiver is a wireless device having both a transmission function and a reception function for radio waves and allowing a user to talk with a plurality of users (to perform unidirectional or bidirectional information transmission). The transceiver can find applications, for example, in construction sites, event venues, and hotels. The transceiver can also be used for radio-dispatched taxis, as another example.

PRIOR ART DOCUMENT

Patent Document

[Patent Document 1] Japanese Patent Laid-Open No. 2018-7005

DISCLOSURE OF THE INVENTION

Problems to be Solved by the Invention

It is an object of the present invention to provide a communication apparatus capable of assisting in information transmission for sharing of recognition, conveyance of intention and the like among a plurality of users with the use of voice and text.

Means for Solving the Problems

According to an embodiment, a communication management apparatus is connected, via a network, to a first terminal where a message content in text format is input by manual input means, to a second terminal where a message information created based on the message content and directed to message destinations is input, and a plurality of third terminals, each of the plurality of third terminals being carried by a different one of users at the message destinations and providing an audio output of the message information. The communication management apparatus includes an instruction assistance section configured to create pieces of character string button information for incorporating part or all of the message content in text format received from the first terminal into a character string constituting the message information; a first control section configured to transmit the pieces of character string button information to the second terminal and to receive the message information in text format created in response to selection of at least one of the pieces of character string button information displayed on a message information input screen of the second terminal; a voice synthesis section configured to create synthesized voice data representing the received message information; a second control section configured to broadcast the synthesized voice data representing the message information to the plurality of third terminals; and a third control section configured to accumulate the message content, the message information, and a result of voice recognition in chronological order as a communication history, the result of voice recognition being acquired from voice recognition processing performed on data of a voice of a speech of a user of at least one of the third terminals responding to the message information, data of the voice of the speech of the user being received from the at least one of the third terminals, and configured to control transmission so as to display the communication history on the terminals in synchronization.

MODE FOR CARRYING OUT THE INVENTION

Embodiment 1

FIGS. 1 to 9 are diagrams showing the configuration of a network of a communication system according to Embodiment 1. The communication system provides an information transmission assistance function with the use of voice and text such that a communication management apparatus (hereinafter referred to as a management apparatus) 100 plays a central role.

Figure 1:
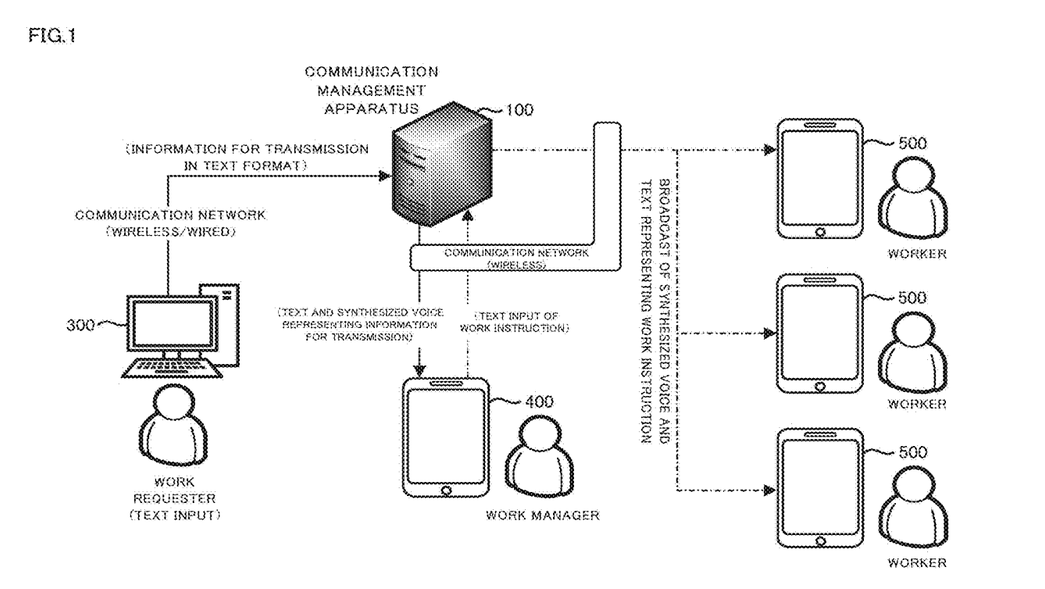
FIG. 1 A diagram showing the configuration of a network of a communication system according to Embodiment 1.

An aspect of using the communication system for hotel room management is described below, by way of example. The management apparatus 100 is connected to a requester terminal 300 which can be operated by a work requester at the front desk. The work requester is a person who directly contacts guests by talking with them and other interactions, and can operate the requester terminal 300 at the front desk. The work requester enters characters representing information for transmission with manual input means such as a keyboard, mouse, screen keyboard, or touch-panel keyboard (or numerical keyboard). The requester terminal 300 transmits the information (information for transmission in text format) entered on the manual input means to the management apparatus 100.

The requester terminal 300 may be a desktop computer or a tablet computer and has a data communication function provided over the Internet Protocol (IP) network or Mobile Communication Network and a computing function (implemented by a CPU or the like). The requester terminal 300 includes a display (or a touch-panel display device) and the manual input means for entering characters described above.

The management apparatus 100 receives the manually input information for transmission in text format from the requester terminal 300 and transmits the information to a work manager terminal (hereinafter referred to as a work MG terminal) 400. In addition to transmission of the text data input from the work requester, the management apparatus 100 can also synthesize voice data representing the information for transmission from the text data and transmit the synthesized voice data to the work MG terminal 400. The work MG terminal 400 is a terminal which can be operated by a work manager. The work manager is a work supervisor or a work responsible person who distributes the information for transmission from the work requester to a plurality of workers (responders to the request). The work manager may be one of a plurality of workers or a supervisor assigned no work.

The work MG terminal 400 may be a mobile communication terminal carried by the work manager and is, for example, a multi-functional cellular phone such as a smartphone, or a portable terminal (mobile terminal) such as a Personal Digital Assistant (PDA) or a tablet terminal. The work MG terminal 400 has a communication function, a computing function, and an input function, and connects to the management apparatus 100 through wireless communication over the Internet Protocol (IP) or Mobile Communication Network to perform data communication. A worker terminal (corresponding to a responder terminal) 500 carried by each worker has the similar configuration to that of the work MG terminal 400.

The work manager enters text representing a work instruction based on the work request on the work MG terminal 400. The work MG terminal 400 transmits the work instruction in text format to the management apparatus 100. The management apparatus 100 creates synthesized voice from the work instruction in text format and broadcasts both the synthesized voice data and the text data representing the work instruction to the worker terminals 500.

The worker terminal 500 performs voice reproduction from the broadcasted synthesized voice data to transmit the work instruction to the associated worker through audio output. The worker can respond by voice to the audio work instruction which he heard. The responding voice, that is, the voice of the speech of the worker is input to the worker terminal 500. The worker terminal 500 transmits the data of the voice of the speech to the management apparatus 100, and the management apparatus 100 registers the content of the speech in a communication history 124. Embodiment 1 provides the audio-based communication function by reading a work instruction aloud to the workers and collecting voices from the workers responding to the work instruction so that the workers do not need manual operation of their terminals which may disturb their works. While the worker terminal 500 has a manual input function, the communication system according to Embodiment 1 allows the workers to perform communication only through voice interaction.

As described above, the communication system according to Embodiment 1 assists in information transmission for sharing of recognition, conveyance of intention and the like in a workflow based on the premise that the information for transmission corresponding to request information is input on the manual input means and the plurality of workers can perform hands-free interaction with each other related to the work instruction.

Specifically, Embodiment 1 introduces a mechanism in which the work manager intervenes between the requester and each of the plurality of workers to facilitate the work instruction created from the work request and issued to the plurality of workers, thereby improving the work efficiency. The work manager is provided with a function of assisting in work instruction input to achieve quicker work instructions and reduced incorrect instructions and miscommunications due to erroneous input. The system according to Embodiment 1 is not limited to assistance of the network of contacts between the requester and the plurality of workers shown as an example, but is used for assistance of information transmission in various other networks of contacts among users contacting each other, resulting in reduced erroneous contacts and miscommunications due to erroneous input.

Along with a text-based communication history of entered characters, the system according to Embodiment 1 also stores a text-based communication history of data converted from the voices of speeches of the workers (including the work manager) through voice recognition processing. Instead of supporting the communication environment or collecting log data based only on voice or only on text, the system according to Embodiment 1 also collects the contents of speeches as the text-based communication history through voice recognition. Thus, this text-based communication history serves as a "visible trail" which can be followed when any failure to hear, missed hearing, or mishearing occurs, thereby reducing the occurrence of miscommunications.

Figure 2:
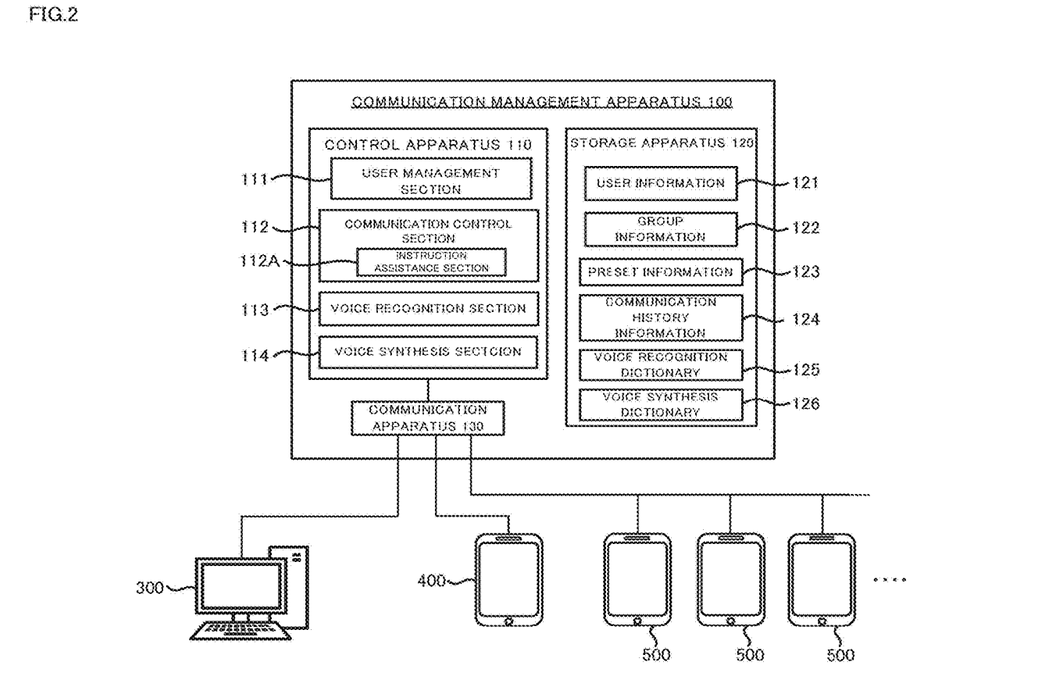
FIG. 2 A block diagram showing the configuration of a communication management apparatus according to Embodiment 1.

FIG. 2 is a block diagram showing the configuration of the communication management apparatus 100. The management apparatus 100 includes a control apparatus 110, a storage apparatus 120, and a communication apparatus 130. The communication apparatus 130 manages communication connection and controls data communication with the requester terminal 300, the work MG terminal 400, and the plurality of worker terminals 500. The communication apparatus 130 can control broadcast to distribute the same content to the plurality of worker terminals 500 at the same time.

The control apparatus 110 includes a user management section 111, a communication control section 112, an instruction assistance section 112A, a voice recognition section 113, and a voice synthesis section 114. The storage apparatus 120 includes user information 121, group information 122, preset information 123, communication history (communication log) information 124, a voice recognition dictionary 125, and a voice synthesis dictionary 126.

Figure 3:
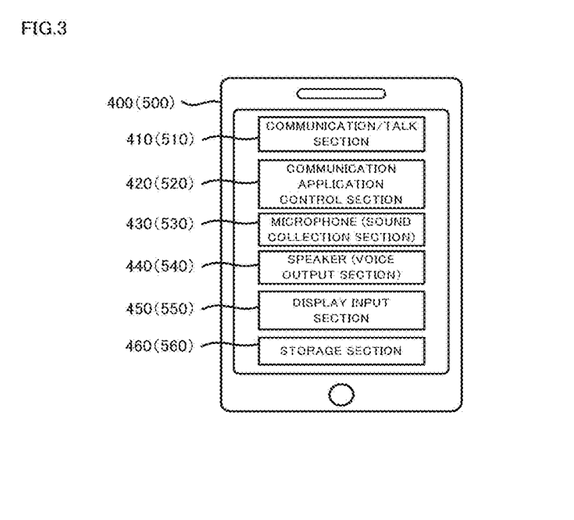
FIG. 3 A block diagram showing the configuration of a mobile communication terminal according to Embodiment 1.

FIG. 3 is a block diagram showing the configuration of the work MG terminal 400 and the worker terminal 500. The terminal includes a communication/talk section 410 (510), a communication application control section 420 (520), a microphone 430 (530), a speaker 440 (540), a display input section such as a touch panel 450 (550), and a storage section 460 (560). The speaker 440 is actually formed of earphones or headphones (whether wired or wireless).

Figure 4:
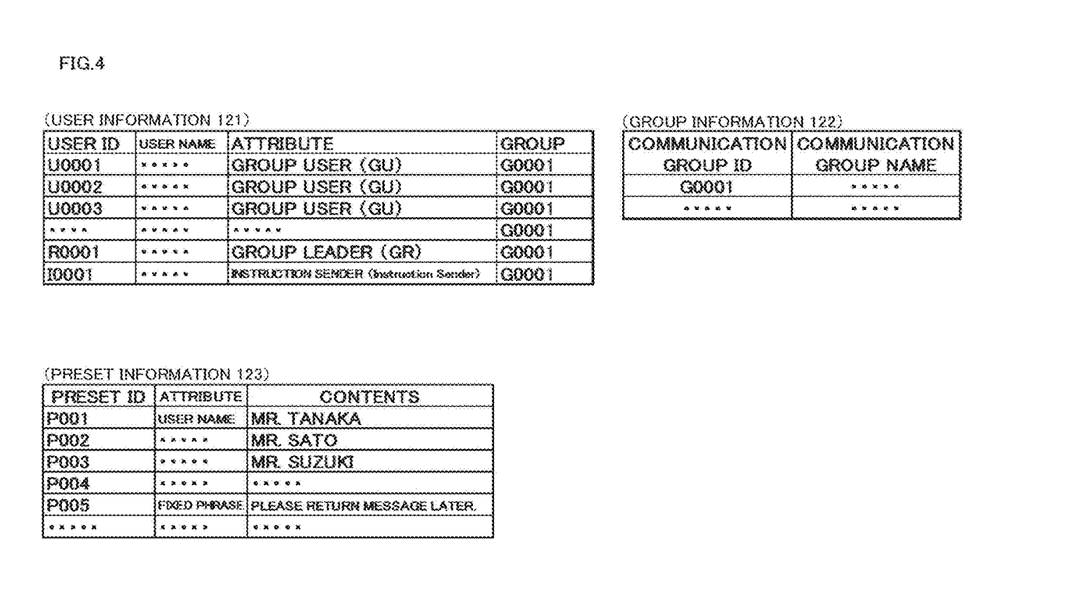
FIG. 4 A diagram showing examples of various types of information according to Embodiment 1.

FIG. 4 is a diagram showing examples of various types of information. The user information 121 is registered information about users of the communication system. The user management section 111 controls a predetermined management screen to allow setting of a user ID, user name, attribute, and group on that screen. The group information 122 is group identification information indicating classification into communication groups. The communication management apparatus 100 controls transmission/reception and broadcast of information for transmission for each communication group ID to prevent mixed information across different communication groups. Each of users in the user information 121 can be associated with the communication group registered in the group information 122.

The grouping can be used, for example, to perform hotel room management in divisions by classifying bellpersons (porters), concierges, and housekeepers (cleaners) into different groups. The communication environment can be established in each of those groups such that the hotel room management is performed within each group. In another viewpoint, communications may not be required for some tasks. For example, serving staff members and bellpersons (porters) do not need to directly communicate with each other, so that they can be classified in different groups. In addition, communications may not be required from geographical viewpoint. For example, when a branch office A and a branch office B are remotely located and do not need to frequently communicate with each other, they can be classified in different groups.

The preset information 123 includes pieces of part information for use in a work instruction creation screen on the work MG terminal 400, later described. To save the effort of character entry on the screen, worker's names, fixed phrases usable in dialogs with workers and the like are registered and their character strings are provided in parts previously. The work manager can create a work instruction easily by displaying the pieces of part information on the screen and selecting and combining appropriate pieces of the part information.

Figure 5:
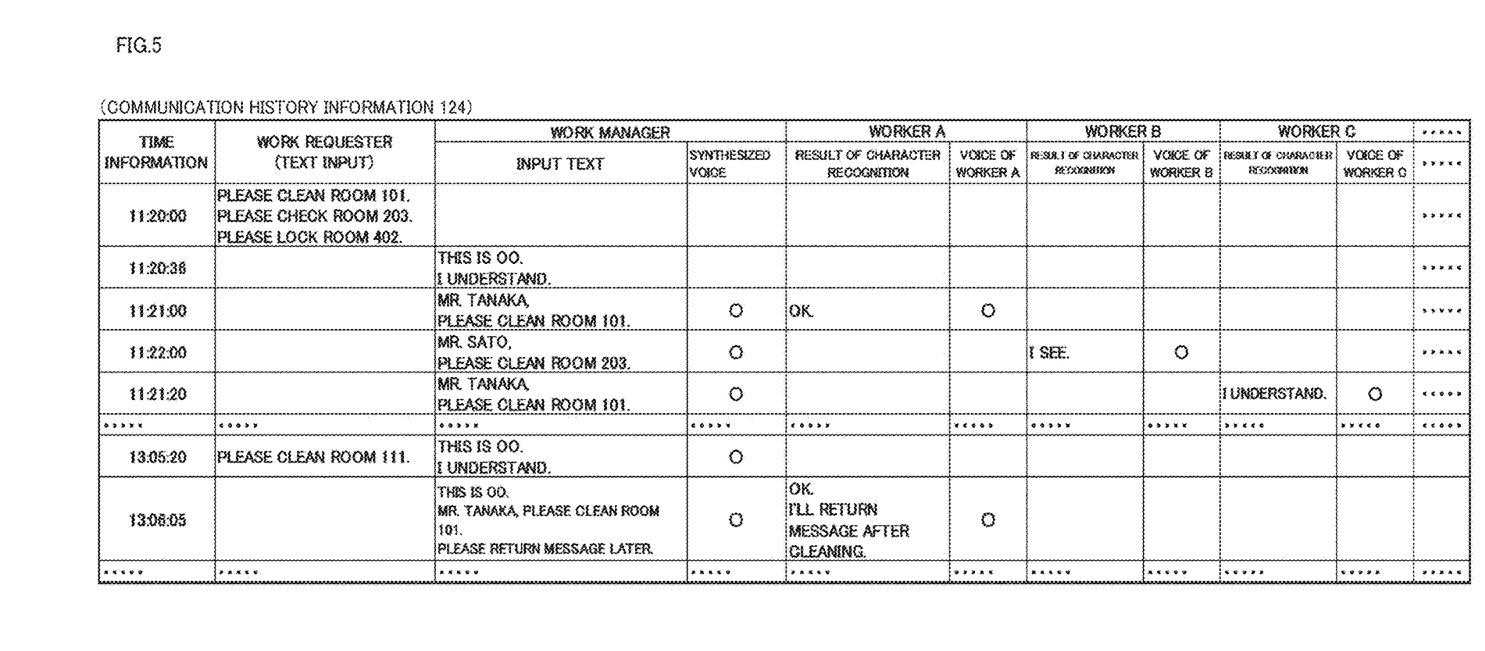
FIG. 5 A diagram showing an example of communication history (log) information according to Embodiment 1.

FIG. 5 is a diagram showing an example of the communication history information 124. The communication history information 124 includes text-based information accumulated in chronological order such as request information from the work requester, input text information from the work manager, work instructions from the work manager, and contents of speeches of the workers, associated with time information. The original voice data before conversion into text format can be stored as a voice file in a predetermined storage region, and the location in that region where the voice file is stored is recorded in the communication history 124. The communication history information 124 is created and accumulated for each communication group.

The work instruction created by the work manager is transmitted to the worker terminal 500 in the form of synthesized voice and is reproduced. Thus, the communication history 124 records a history indicating the delivery of the work instruction in the form of synthesized voice in association with the input work instruction in text format. It should be noted that voices of speeches input to the work MG terminal 400 and the worker terminal 500 undergo voice recognition processing in the voice recognition section 113, and the result of the voice recognition is output in text format and stored in the communication history 124.

The voice recognition section 113 performs the voice recognition processing with the voice recognition dictionary 125 and outputs the result of the voice recognition in text data format. The voice recognition processing can be performed based on a known technique. The voice synthesis section 114 synthesizes voice data corresponding to input characters in text data format with the voice synthesis dictionary 126 to create synthesized voice data representing the work instruction. The materials of voice data forming the synthesized voice data can be provided by using previously registered voices of the work manager.

The single communication history 124 shown in FIG. 5 is displayed, for example, on each of the requester terminal 300, the work MG terminal 400, and the worker terminals 500. Specifically, each of the requester terminal 300, the work MG terminal 400, and the worker terminals 500 receives the communication history 124 from the management apparatus 100 in real time or at a predetermined time to synchronize the data displayed to the work requester, the work manager, and the plurality of workers, thereby allowing the past communication log to be referred to in chronological order.

Figure 6:
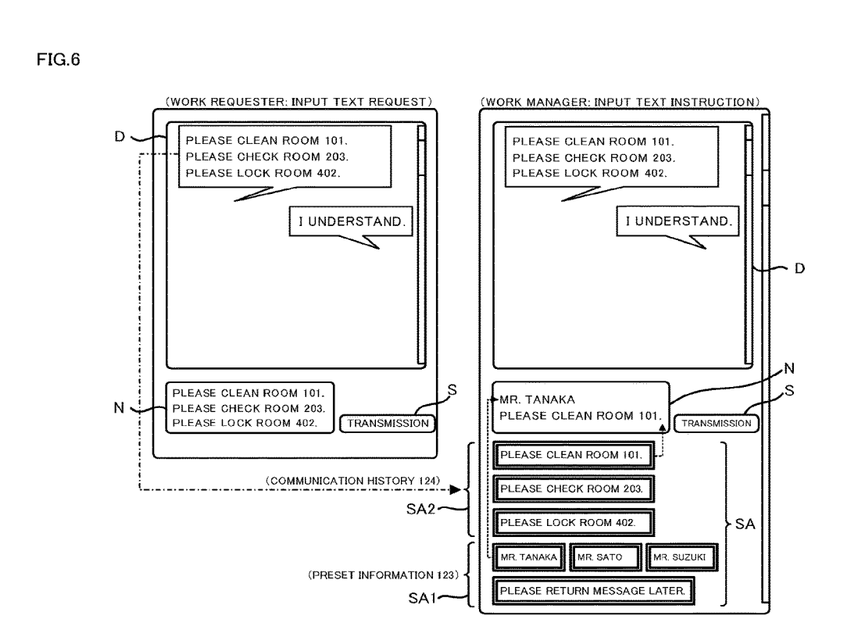
FIG. 6 A diagram showing examples of screens displayed on a terminal of a requester and on a mobile communication terminal of a work manager according to Embodiment 1.
Figure 7:
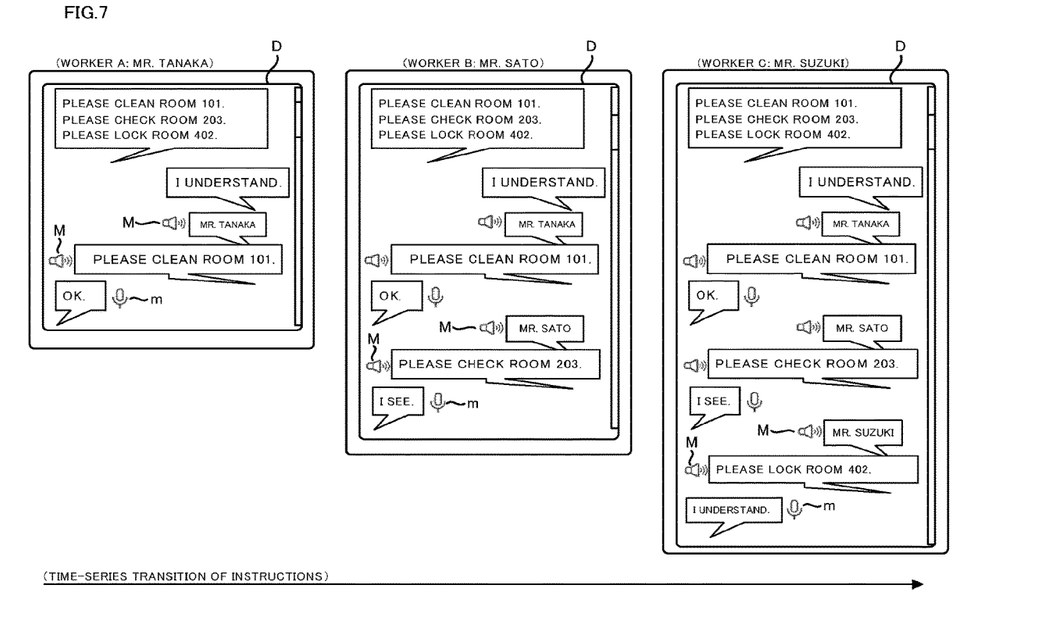
FIG. 7 A diagram showing examples of screens displayed on mobile communication terminals of workers according to Embodiment 1.

FIG. 6 shows examples of screens displayed on the terminal 300 of the work requester and the terminal 400 of the work manager. FIG. 7 shows examples of screens displayed on the worker terminals. First, each of the work requester, the work manager, and the workers performs an initial operation by logging in to the management apparatus 100 on a predetermined log-in screen with the registered user ID and password. Log-in authentication processing is performed by the user management section 111.

A work requester screen displayed on the requester terminal 300 of the work requester shown on the left in FIG. 6 includes a display field D, an input field N, and a transmission button S. The screen information of the work requester screen can be provided by the management apparatus 100 and displayed on the display by a display control function (including a browser) of the requester terminal 300, or the screen information can be previously downloaded onto the requester terminal 300 and displayed on the display by a control section of the requester terminal 300 after log-in authentication.

The work requester enters characters indicating the work request content into the input field N with the manual input means. Then, the work requester presses the transmission button S, and the work request content is transmitted to the management apparatus 100 and displayed on the display field D. The display on the display field D can be controlled such that the content in the input field N is copied to the display field D, or without copying within the requester terminal 300, the content is accumulated in the communication history 124 of the management apparatus 100 and then the management apparatus 100 performs display synchronization processing by transmitting the received work request content to the requester terminal 300 and displaying the content on the display field D.

A work MG screen is displayed on the work MG terminal 400 of the work manager shown on the right in FIG. 6. Similarly to the work requester screen, the work MG screen includes a display field D in which the text-based communication history 124 is displayed, an input field N, and a transmission button S. The work MG screen is a request information input screen and also includes a work instruction input assistance area SA providing an input function.

The work instruction input assistance area SA is an area for displaying a group of preset buttons SA1 representing the part information within the preset information 123 described above and a group of request content buttons SA2 provided by dividing the character string of the work request content entered from the work requester into parts corresponding to the respective buttons.

The communication control section 112 includes the instruction assistance section 112A. The instruction assistance section 112A creates the group of preset (character string) buttons SA1 and the group of request content (character string) buttons SA2 based on the preset information 123 and the text information representing the work request content recorded in the communication history 124. The communication control section 112 controls the display synchronization processing on the work MG screen by transmitting the button information in the groups of buttons SA1 and SA2 created by the instruction assistance section 112A together with the text representing the work request content and displaying them on the work MG screen.

The communication application control section 320 of the work MG terminal 400 displays the received text representing the work instruction content in the display field D and also displays the groups of buttons SA1 and SA2 in the work instruction input assistance area SA based on the received button information. In response to selection of any button of the groups of buttons SA1 and SA2, the communication application control section 320 displays text information associated with the selected button (for example, a character text labeled on the selected button) in the input field N until texts of information associated with sequentially selected buttons are listed in the input field N. When the work manager selects the transmission button S, the character string indicating the work instruction content displayed in the input field N is transmitted to the management apparatus 100. The management apparatus 100 stores the work instruction content received from the work MG terminal 400 in the communication history 124. The text indicating the work instruction content is transmitted to the requester terminal 300 for display synchronization.

As described above, the communication management apparatus 100 according to Embodiment 1 divides the work request content in text format entered by the manual input means into parts and provides the parts in the form of character input buttons, and also provides the part information within the registered preset information 123 in the form of preset character input buttons. The work manager is provided with the buttons of the character strings representing the work instruction content when the work manager issues the work instruction to the workers, which can save the effort of character entry and prevent the occurrence of miscommunications due to erroneous character entry or missed hearing or misunderstanding of the work request content.

In particular, the work request content in text format entered by the manual input means is divided into parts without any change, and those parts are provided in the form of character input buttons, thereby allowing prevention of the occurrence of miscommunications.

FIG. 7 shows examples of screens displayed on the worker terminals 500. In response to reception of the work instruction content from the work MG terminal 400, the voice synthesis section 114 of the management apparatus 100 creates a synthesized voice corresponding to the received work instruction content with voice synthesis dictionary 126. The communication control section 112 transmits the synthesized voice data representing the work instruction content to each of the worker terminals 500 together with the work instruction content in text format. The communication application control section 520 displays the received work instruction content in text format in a display field D and performs automatic reproduction processing for the synthesized voice data to output the reproduced voice representing the work instruction from the speaker 440. As shown in the example of FIG. 7, the text associated with the synthesized voice data may be accompanied by a voice mark M in the display field D.

In the example of FIG. 7, one of the workers, Mr. Tanaka, responds to the instruction by voice when the instruction is issued to him. The communication application control section 520 performs sound collection processing through the microphone 530 to acquire the collected voice of the speech of Mr. Tanaka, along with the automatic reproduction processing for the synthesized voice data. The communication application control section 520 transmits the data of the voice of the speech to the management apparatus 100. The voice recognition section 113 performs voice recognition processing for the received data of the voice of the speech and outputs the result of the voice recognition representing the content of the speech. The communication control section 112 stores the result of the voice recognition in the communication history 124 and stores the data of the voice of the speech (data including live voice of Mr. Tanaka) in the storage apparatus 120.

The communication control section 112 transmits the content of the speech of Mr. Tanaka (in text format) stored in the communication history 124 to the requester terminal 300, the work MG terminal, and the worker terminals 500 of the workers including Mr. Tanaka for display synchronization. The communication application control section 520 can perform control to display the content of the speech of Mr. Tanaka (in text format) received from the management apparatus 100 in the display field D and to display a sound collection mark m indicating that sound collection has been performed. The processing described above is repeated for the other workers.

As shown in the example of FIG. 7, each of the worker terminals 500 of the workers other than Mr. Tanaka displays work instructions to the workers other than himself and contents of speeches of the workers other than himself in a display field D in chronological order to share the communication history 124 accumulated in the management apparatus 100 among the worker terminals as log information. A worker terminal 500 of Mr. Sato displays the work instruction from the work manager to Mr. Tanaka and his response by voice and then a work instruction to Mr. Sato and his response by voice in the display field D. A worker terminal 500 of Mr. Suzuki similarly displays information as described above.

As described above, the plurality of workers share the work instructions issued to the workers other than themselves as well as the work instructions issued to themselves, which can facilitate voluntary communication between the workers to perform the works more efficiently. For example, when a worker is requested to do a work but has no time for the work, or when another worker can do the work more efficiently than the requested worker, the workers can voluntarily speak to interact with the work manager so that an appropriate work instruction can be determined. In addition, since the display of the communication history 124 is synchronized, the plurality of workers can review the past communications shared among them.

Figure 8:
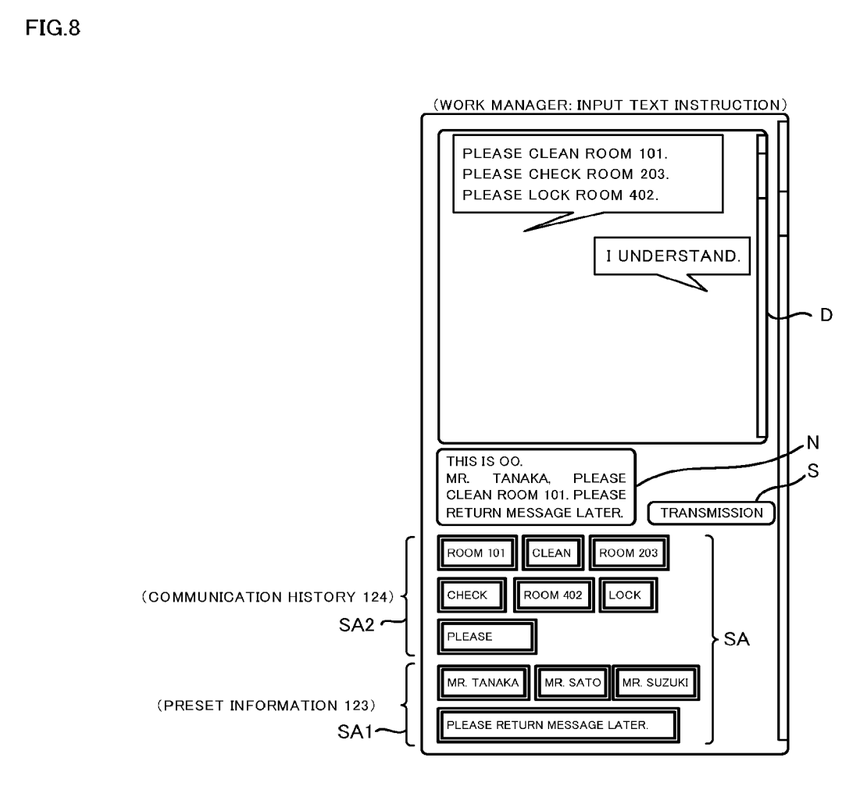
FIG. 8 A diagram showing another example of the screen displayed on the terminal of the work manager according to Embodiment 1.

FIG. 8 is a diagram showing another example of the work MG screen displayed on the work MG terminal 400. In the example of FIG. 8, a group of request content buttons SA2 in a work instruction input assistance area SA is formed of a group of keywords provided by subdividing each of sentences representing the work request content.

For example, the instruction assistance section 112A can perform well-known morphological analysis processing for the text information representing the work request content recorded in the communication history 124 to extract keywords (character strings of the minimum unit representing a meaningful word) and change the keywords into different buttons. Specifically, the instruction assistance section 112A subdivides a sentence "please clean room 101" into keywords "please," "clean," and "room 101," and provides the keywords in the form of button information. It should be noted that any keyword included in more than one sentence, for example the keyword "please," can be included only once in the group of request content buttons SA2.

With this configuration, the work manager can assemble, in response to the two work requests including "please clean room 101" and "please clean room 108," a single sentence "please clean room 101 and room 108" and make a work instruction with the single sentence. The combination of the groups of buttons SA1 and SA2 also allows the work manager to assemble an individual and specific instruction as "Mr. Tanaka, please clean room 101 and room 108. Return message later."

Figure 9:
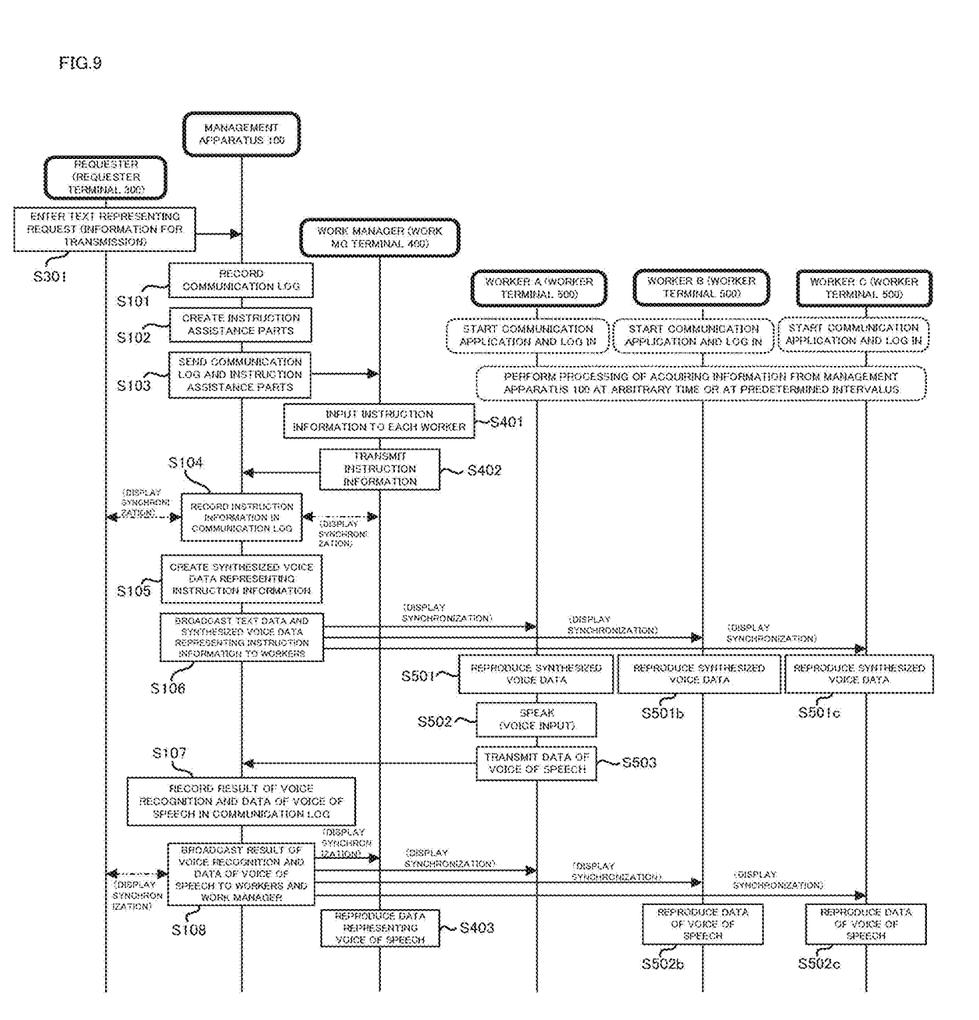
FIG. 9 A diagram showing a flow of processing performed in the communication system according to Embodiment 1.

FIG. 9 is a diagram showing a flow of processing performed in the communication system according to Embodiment 1. As described above, the management apparatus 100 performs the preparatory processing by registering the user information 121 and the group information 122. The management apparatus 100 also performs the registration processing for the preset information along with the registration of the user information 121. Each of the users operating the requester terminal 300, the work MG terminal 400, and the worker terminals 500 logs in to the management apparatus 100 with his user ID.

The work requester enters characters representing a work request content in the work requester screen displayed on the requester terminal 300 by the manual input means such as a keyboard. The work request content is transmitted to the management apparatus 100 as information for transmission in text format (S301).

The communication control section 121 stores the received work request content in text format into the communication history 124 (S101). The instruction assistance section 112A creates the group of preset buttons SA1 and the group of request content buttons SA2 based on the preset information 123 and the work request content (S102). The communication control section 112 transmits the work request content in text format and the button information indicated on the groups of buttons SA1 and SA2 to the work MG terminal 400 (S103).

The communication application control section 420 of the work MG terminal 400 displays the received work instruction content in text format in the display field D and displays the groups of buttons SA1 and SA2 in the work instruction input assistance area SA based on the received button information. In response to selection of any button of the groups of buttons SA1 and SA2, the communication application control section 320 displays text information associated with the selected button in the input field N until texts of information associated with sequentially selected buttons are listed in the input field N (S401). When the work manager selects the transmission button S, the communication application control section 420 transmits the character strings indicating the work instruction content displayed in the input field N to the management apparatus 100 (S402).

The communication control section 112 of the management apparatus 100 stores the work instruction content received from the work MG terminal 400 into the communication history 124 (S104). The communication control section 112 transmits the work instruction content in text format to the requester terminal 300 and the work MG terminal 400 for display synchronization.

The voice synthesis section 114 of the management apparatus 100 creates a synthesized voice representing the work instruction (S105). The communication control section 112 broadcasts the work instruction content in text format and the synthesized voice data representing the work instruction content to the plurality of worker terminals 500 (S106). The communication application control section 520 of each of the worker terminals 500 displays the received work instruction content in text format in the display field D and performs automatic reproduction processing for the synthesized voice data to output the reproduced voice representing the work instruction (S501). In the respective display fields D of the worker terminals 500, the same work instruction content is displayed in synchronization, and the voice representing the same work instruction is output (S501b, S501c).

One of the workers (worker A) responds to the instruction by voice when the instruction is issued to him. The communication application control section 520 collects the voice of his speech (S502) and transmits the data of the collected voice of the speech to the management apparatus 100 (S503). The voice recognition section 113 of the management apparatus 100 performs voice recognition processing for the received data of the voice of the speech and outputs the result of the voice recognition representing the content of the speech. The communication control section 112 stores the result of the voice recognition in the communication history 124 and stores the data of the voice of the speech in the storage apparatus 120 (S107).

The communication control section 112 transmits the content of the speech of the worker (in text format) stored in the communication history 124 to the requester terminal 300, the work MG terminal 400, and the worker terminals 500 of the workers including the worker who spoke, for display synchronization (S108). The communication control section 112 broadcasts the data of the voice of the speech to the work MG terminal 400 and the worker terminals 500 of the workers other than the worker who spoke. Each of the work MG terminal 400 and the communication application control sections 520 of the worker terminals of the workers other than the worker who spoke displays the received content of the speech in text format in the display field D and performs automatic reproduction processing for the data of the voice of the speech to output the reproduced voice (S403, S502b, and S502c).

The communication system according to Embodiment 1 includes the communication management apparatus 100 connected, via the network, to the requester terminal 300 that receives the work request content in text format input by the manual input means, to the work MG terminal 400 that receives input of the work instruction created based on the work request content and directed to the workers, and to the plurality of worker terminals 500, each of the plurality of worker terminals being carried by a different one of the workers and providing an audio output of the work instruction.

The communication management apparatus 100 receives the work request content in text format from the request terminal 300. The instruction assistance section 112A creates the pieces of character string button information (group of request content buttons SA2) for incorporating part or all of the work request content into a character string constituting the work instruction.

The communication control section 112 provides a first control function by transmitting the character string button information to the work MG terminal 400 and receiving the work instruction in text format created in response to selection of at least one of the pieces of the character string button information displayed on the work instruction input screen of the work MG terminal 400. The voice synthesis section 114 creates the synthesized voice data representing the received work instruction.

The communication control section 112 provides a second control function by broadcasting the synthesized voice data representing the work instruction crated by the work manager to the plurality of worker terminals 500. Each of the worker terminals 500 performs reproduction processing for the synthesized voice data representing the work instruction and provides an audio output of the reproduced data through earphones or other means.

The communication control section 112 provides a third control function by accumulating the work request content, the work instruction, and the result of voice recognition in chronological order as the communication history 124, the result of voice recognition being acquired from the voice recognition processing performed on the data of the voice of the speech of the worker responding to the work instruction, the result of voice recognition being received from the worker terminal 500, and controlling transmission so as to display the communication history on the terminals 300, 400, and 500 in synchronization.

Thus, the communication management apparatus 100 according to Embodiment 1 can relieve the workload of the work manager involved in the work instructions and reduce erroneous instructions and miscommunications due to incorrect input. Since the communication management apparatus stores the text-based communication history of data converted from the voices of speeches of the workers through voice recognition processing as well as the text-based communication history of entered characters, the text-based communication history serves as a "visible trail" to further reduce the occurrence of miscommunications.

As described above, the communication management apparatus 100 according to Embodiment 1 assists in the communication between the plurality of terminals connected to each other via the network, and the plurality of terminals are configured such that a first terminal (for example, the work MG terminal 400) presents a request to the other terminals (for example, the worker terminals 500). The communication management apparatus 100 is configured to include the first control section configured to receive the request content in text format (the request content input in text format on the requester terminal 300) directed to the first terminal, the voice synthesis section configured to create the synthesized voice data representing part or all of the received request content, and the second control section configured to broadcast the synthesized voice data to the other terminals. The processing in each of the first and second control sections is performed by the communication control section 112 in FIG. 2.

The communication management apparatus 100 further includes the instruction assistance section 112A configured to create the pieces of character string button information for incorporating part or all of the received request content in text format into the request to the other terminals. The first control section (communication control section 112) transmits the character string button information to the first terminal and receives the request in text format created in response to selection of at least one of the pieces of the character string button information on the first terminal. The communication control section 112 broadcasts the synthesized voice data representing the received request from the first terminal and created by the voice synthesis section to the other terminals.

The communication control section 112 provides the function of the third control section function by accumulating the responses from the other terminals to the request in chronological order as the communication history 124 and controlling transmission so as to display the communication history 124 on the first terminal and the other terminals in synchronization.

While Embodiment 1 has been described above, the apparatus according to Embodiment 1 is applicable, for example to building management in a security service business, in addition to the hotel room management illustrated above. In this case, a central monitoring center for monitoring conditions of buildings corresponds to the work requester serving as an information sender, a control center in each building corresponds to the work manager, and a security personnel corresponds to the worker. Another example is berth management in a logistics industry. In this case, a warehouse manager (personnel responsible for monitoring available space over the entire warehouse) corresponds to the requester serving as an information sender, a berth manager corresponds to the work manager, and a driver corresponds to the worker. The apparatus according to the present invention can reduce waiting time for loads and streamline loading and unloading from the warehouse.

The functions of the communication management apparatus 100 described above can be implemented by a program. A computer program previously provided for implementing each function can be stored on an auxiliary storage apparatus, the program stored on the auxiliary storage apparatus can be read by a control section such as a CPU to a main storage apparatus, and the program read to the main storage apparatus can be executed by the control section to allow a computer to perform the function of each component of the communication management apparatus 100.

The functions of the voice recognition section 113 and the voice synthesis section 114 may be provided by using an external voice recognition server and an external voice synthesis server, respectively, so that the communication management apparatus 100 may not directly include any processing function corresponding to those sections. In other words, voice data can be transmitted to the external voice recognition server and the result of voice recognition (in text format) may be received therefrom, or text data may be transmitted to the external voice synthesis server and the resulting synthesized voice data may be received therefrom. Alternatively, the functions of the voice recognition and voice synthesis may be provided by the mobile communication terminal 500 of the worker. In this case, the terminal 500 may automatically convert the voice of a speech of the worker into text data and transmits the automatically converted text data to the communication management apparatus 100 together with the data of the voice of the speech, or may synthesize and output voice from received text information representing an instruction.

The program may be recorded on a computer readable recording medium and provided for the computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy disk® and removable hard disk, and memory cards such as a compact flash®, smart media, SD memory card, and memory stick. Hardware apparatuses such as an integrated circuit (such as an IC chip) designed and configured specifically for the purpose of the present invention are included in the recording medium.

While the embodiment of the present invention has been described above, the embodiment is only illustrative and is not intended to limit the scope of the present invention. The novel embodiment can be implemented in various other forms, and various omissions, substitutions, and modifications can be made thereto without departing from the spirit or scope of the present invention. The embodiment and its variations are encompassed within the spirit or scope of the present invention and within the invention set forth in the claims and the equivalents thereof.

DESCRIPTION OF THE REFERENCE NUMERALS

100 COMMUNICATION MANAGEMENT APPARATUS
110 CONTROL APPARATUS
111 USER MANAGEMENT SECTION
112 COMMUNICATION CONTROL SECTION
112A INSTRUCTION ASSISTANCE SECTION
113 VOICE RECOGNITION SECTION
114 VOICE SYNTHESIS SECTION
120 STORAGE APPARATUS
121 USER INFORMATION
122 GROUP INFORMATION
123 PRESET INFORMATION
124 COMMUNICATION HISTORY INFORMATION
125 VOICE RECOGNITION DICTIONARY
126 VOICE SYNTHESIS DICTIONARY
130 COMMUNICATION APPARATUS
300 REQEUSTER TERMINAL
400 WORK MANAGER TERMINAL (WORK MG TERMINAL)
500 WORKER TERMINAL
410, 510 COMMUNICATION/TALK SECTION
420, 520 COMMUNICATION APPLICATION CONTROL SECTION
430, 530 MICROPHONE (SOUND COLLECTION SECTION)
440, 540 SPEAKER (VOICE OUTPUT SECTION)
450, 550 DISPLAY/INPUT SECTION
460, 560 STORAGE SECTION
D DISPLAY FIELD
N INPUT FIELD
S TRANSMISSION BUTTON
SA WORK INSTRUCTION INPUT ASSISTANCE AREA
SA1 GROUP OF PRESET BUTTONS
SA2 GROUP OF REQUEST CONTENT BUTTONS

The invention claimed is:

1. A communication management apparatus connected, via a network, to a first terminal where a message content in text format is input by manual input means, to a second terminal where a message information created based on the message content and directed to message destinations is input, and to a plurality of third terminals, each of the plurality of third terminals being carried by a different one of users at the message destinations and providing an audio output of the message information, the communication management apparatus comprising:
    an instruction assistance section configured to create pieces of character string button information for incorporating part or all of the message content in text format received from the first terminal into a character string constituting the message information;
    a first control section configured to transmit the pieces of character string button information to the second terminal and to receive the message information in text format created in response to selection of at least one of the pieces of character string button information displayed on a message information input screen of the second terminal;
    a voice synthesis section configured to create synthesized voice data representing the received message information;
    a second control section configured to broadcast the synthesized voice data representing the message information to the plurality of third terminals; and
    a third control section configured to accumulate the message content, the message information, and a result of voice recognition in chronological order as a communication history, the result of voice recognition being acquired from voice recognition processing performed on data of a voice of a speech of a user of at least one of the third terminals responding to the message information, data of the voice of the speech of the user being received from the at least one of the third terminals, and configured to control transmission so as to display the communication history on the terminals in synchronization.

2. The communication management apparatus according to claim 1, wherein preset information including names of the users at the message destinations and a fixed phrase forming a part of the message information is previously registered,
    the instruction assistance section is configured to create, based on the preset information, pieces of preset character string button information for incorporating the names of the users and the fixed phrase into a character string constituting the message information, and
    the first control section is configured to transmit the pieces of character string button information and the pieces of preset character string button information to the second terminal and to receive the message information in text format created in response to selection of at least one of the pieces of character string button information and the preset character string button information displayed on the message information input screen of the second terminal.

3. The communication management apparatus according to claim 1, wherein the message content in text format includes a plurality of different message contents, and
    the instruction assistance section is configured to create the pieces of character string button information, each of the pieces being associated with a different one of the plurality of different message contents.

4. The communication management apparatus according to claim 1, wherein the instruction assistance section is configured to extract a plurality of keywords from the message content in text format and to create the pieces of character string button information, each of the pieces being associated with a different one of the keywords.

5. A program comprising instructions executable by a computer connected, via a network, to a first terminal where a message content in text format is input by manual input means, to a second terminal where a message information created based on the message content and directed to message destinations is input, and to a plurality of third terminals, each of the plurality of third terminals being carried by a different one of users at the message destinations and providing an audio output of the message information, wherein the instructions, when executed by the computer, cause the computer to provide:
    a first function of creating pieces of character string button information for incorporating part or all of the message content in text format received from the first terminal into a character string constituting the message information;
    a second function of transmitting the pieces of character string button information to the second terminal and to receive the message information in text format created in response to selection of at least one of the pieces of character string button information displayed on a message information input screen of the second terminal;

a third function of creating synthesized voice data representing the received message information;

a fourth function of broadcasting the synthesized voice data representing the received message information to the plurality of third terminals; and a fifth function of accumulating the message content, the message information, and a result of voice recognition in chronological order as a communication history, the result of voice recognition being acquired from voice recognition processing performed on data of a voice of a speech of a user of at least one of the third terminals responding to the message information, data of the voice of the speech of the user being received from the at least one of the third terminals, and configured to control transmission so as to display the communication history on the terminals in synchronization.

6. A communication management apparatus for performing communication between a plurality of terminals connected to each other via a network, wherein the plurality of terminals are configured such that a first terminal of the plurality of terminals transmits a message to the other terminals, the communication management apparatus comprising:

a first control section configured to receive a message content in text format transmitted to the first terminal;

a voice synthesis section configured to create synthesized voice data representing part or all of the received message content; and a second control section configured to broadcast the synthesized voice data to the other terminals, wherein the second control section is configured to broadcast the data of the voice of speech related to a response to the message content received from another terminal to which the synthesized voice data was broadcasted, to the first terminal and other terminals other than that transmitted the data of the voice of the speech, further comprising a voice recognition section configured to performs voice recognition processing for the data of the voice of the speech related to a response to the message content received from another terminal to which the synthesized voice data was broadcasted, and outputs a result of the voice recognition representing, and a third control section configured to accumulate the message content broadcasted as the synthesized voice data and the result of the voice recognition representing for the data of the voice of the speech related to the response to the message content received from another terminal to which the synthesized voice data was broadcasted in chronological order as a communication history, and to control transmission so as to display the communication history on the first terminal and the other terminals in synchronization.

7. The communication management apparatus according to claim 6, further comprising an instruction assistance section configured to create pieces of character string button information for incorporating part or all of the received message content in text format into the message information to the other terminals;

wherein the first control section is configured to transmit the pieces of character string button information to the first terminal and to receive the message information in text format created in response to selection of at least one of the pieces of character string button information on the first terminal; and the voice synthesis section is configured to create synthesized voice data representing the message information received from the first terminal.

8. The communication management apparatus according to claim 7, wherein preset information including names of users of the other terminals at message destinations and a fixed phrase forming a part of the message information is previously registered, the instruction assistance section is configured to create, based on the preset information, pieces of preset character string button information for incorporating the names of the users and the fixed phrase into a character string constituting the message information, and the first control section is configured to transmit the pieces of character string button information and the pieces of preset character string button information to the first terminal and to receive the message information in text format created in response to selection of at least one of the pieces of the button information on the first terminal.

9. The communication management apparatus according to claim 7, wherein the message content in text format includes a plurality of different message contents, and the instruction assistance section is configured to create the pieces of the character string button information, each of the pieces being associated with a different one of the plurality of different message contents.

10. The communication management apparatus according to claim 7, wherein the instruction assistance section is configured to extract a plurality of keywords from the message content in text format and to create the pieces of the character string button information, each of the pieces being associated with a different one of the keywords.

11. The communication management apparatus according to claim 6, further comprising a fourth control section configured to be displayed a voice mark to the communication history corresponding to the synthesized voice data in displaying the communication history, the voice mark indicated that the message content was broadcasted as the synthesized voice data.

* * * * *